June 2, 1964

W. S. RAYNOR 3,135,150

PALLET LOADING MACHINE

Filed Oct. 23, 1961

INVENTOR.
WARREN S. RAYNOR
BY
Mead, Browne, Schuyler & Beveridge
ATTORNEYS

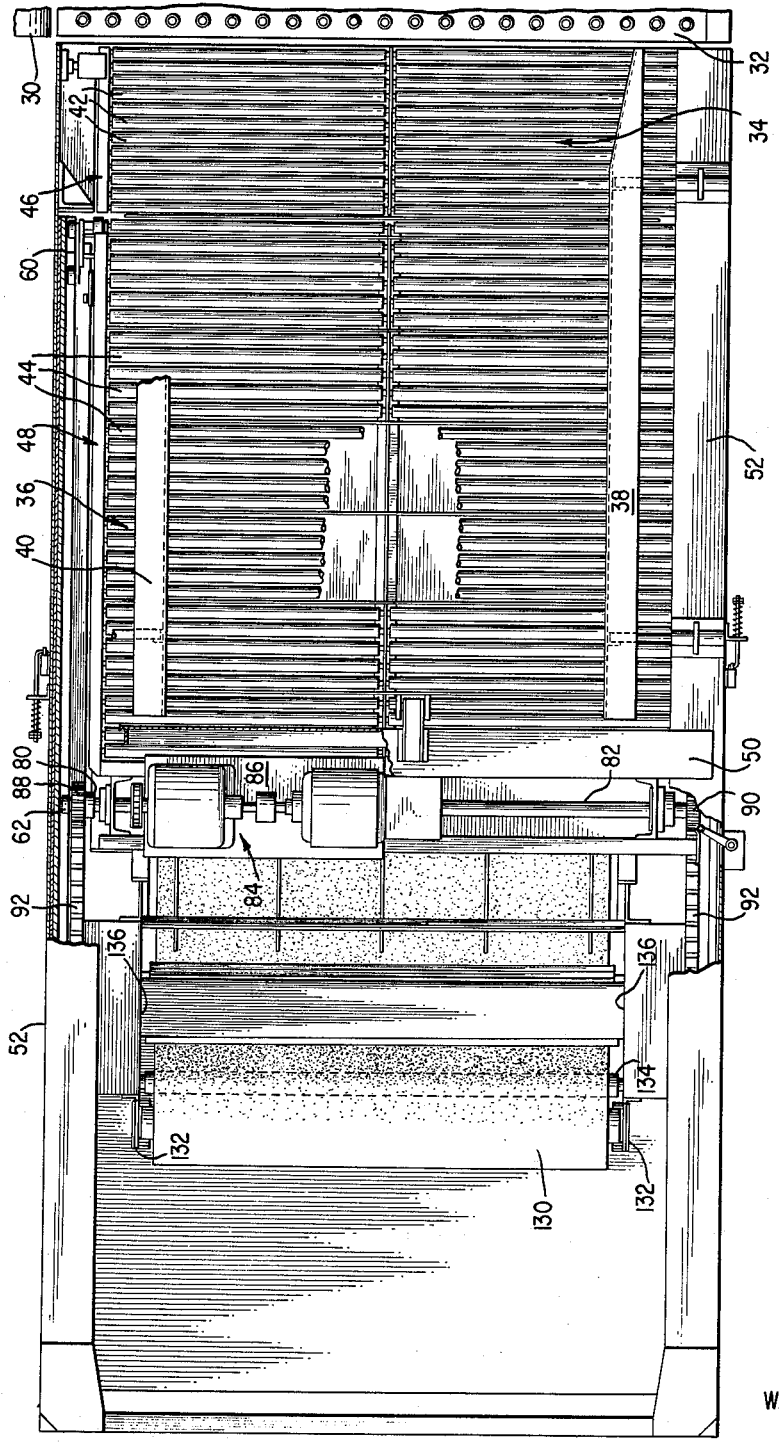

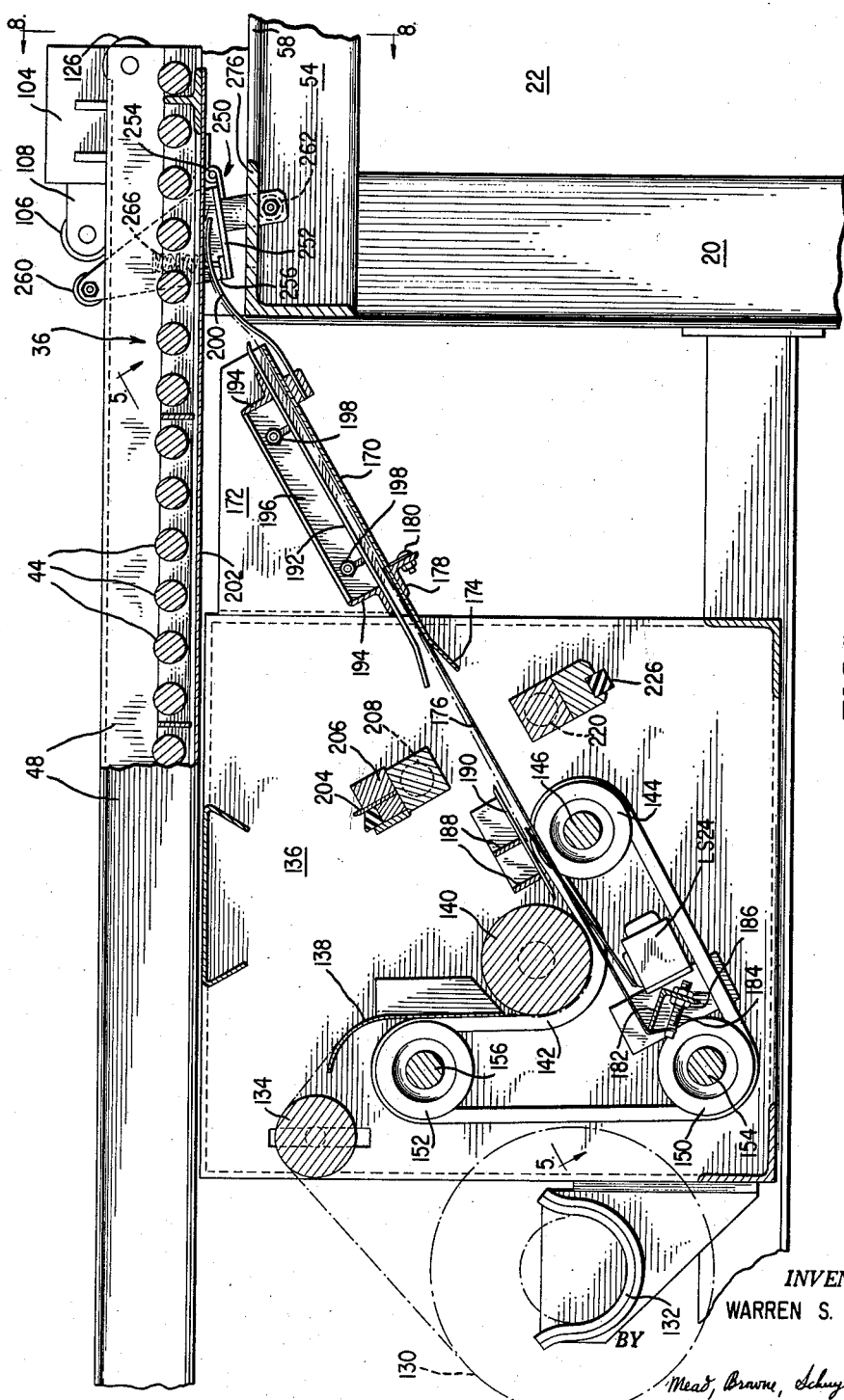

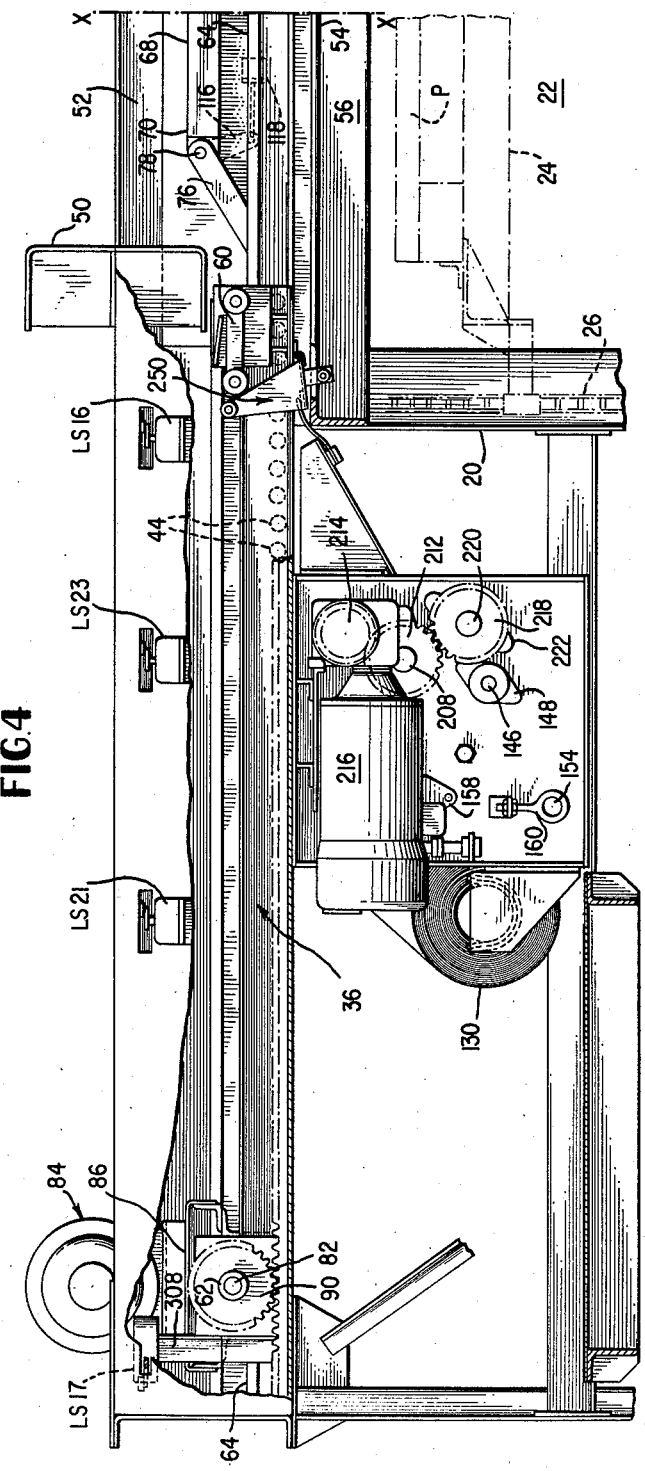
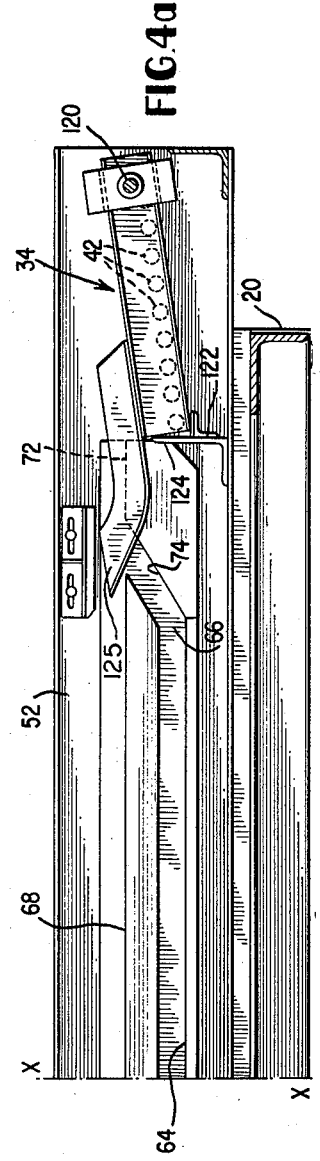

June 2, 1964  W. S. RAYNOR  3,135,150
PALLET LOADING MACHINE
Filed Oct. 23, 1961  6 Sheets-Sheet 5

INVENTOR.
WARREN S. RAYNOR
BY
Mead, Browne, Schuyler & Beveridge
ATTORNEYS

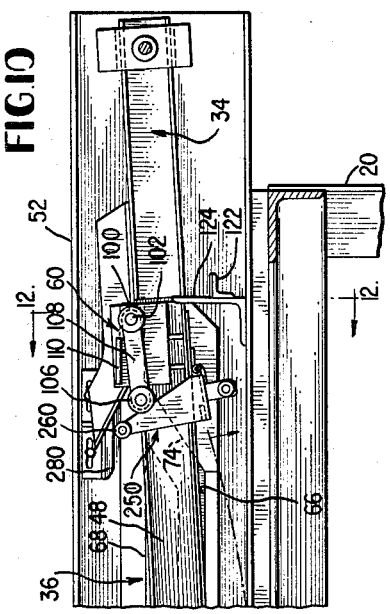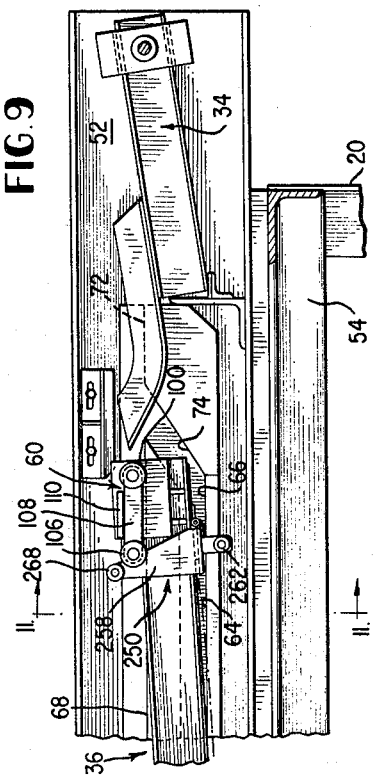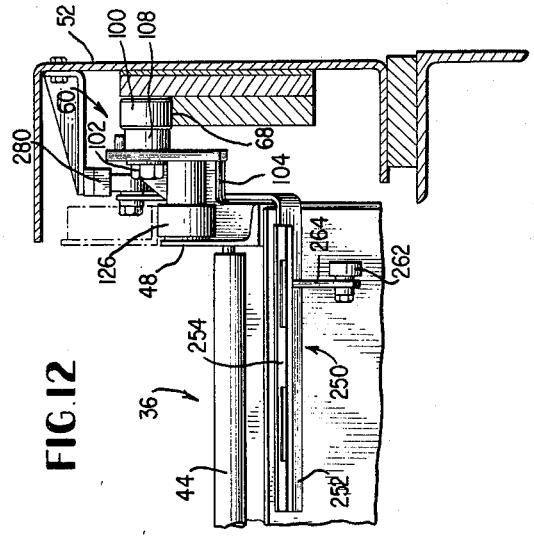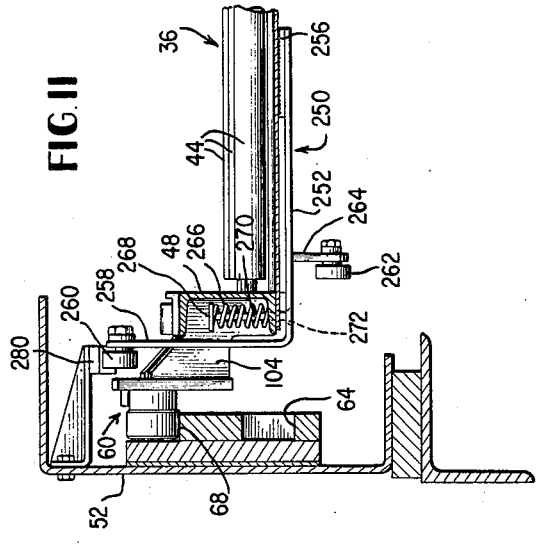
INVENTOR.
WARREN S. RAYNOR

United States Patent Office 3,135,150
Patented June 2, 1964

3,135,150
PALLET LOADING MACHINE
Warren S. Raynor, Port Hope, Ontario, Canada, assignor to Mathews Conveyor Company, Ellwood City, Pa., a corporation of Pennsylvania
Filed Oct. 23, 1961, Ser. No. 146,849
18 Claims. (Cl. 83—94)

This invention relates to pallet loading machines, and more particularly to apparatus for improving the stability of a stack of articles assembled by the machine upon a pallet.

In pallet loading machines of the type of which the present invention is concerned, a rectangular apron is mounted upon the machine frame for reciprocation into and out of overlying relationship with a pallet lift vertically movable within a lift shaft in coordination with movements of the apron. A layer of articles to be stacked upon the pallet supported upon the lift is assembled upon the apron when the apron overlies the lift and the apron is then withdrawn to one side of the lift. A stripper bar extending across the side toward which the apron is withdrawn engages the adjacent side of the layer of articles and, as the apron is retracted beneath the stripper bar, the articles drop over the retracting edge of the apron onto the lift. The lift is then lowered until the deposited layer of articles is located below the path of movement of the apron, at which time the apron is returned into overlying relationship with the lift. Repeated cycles of assembling a layer of articles upon the apron, stripping the articles by retracting the apron to deposit the layer upon the lift and subsequent lowering of the lift successively form layers into a multi-layer stack upon the lift.

In the usual case, the articles handled by such machines consist of relatively large rectangular cartons, a typical example being a case of beer containing twenty-four twelve ounce cans. Such cases are customarily packed in a rectangular case in which the twenty-four cans are arranged in four rows of six cans each. The variation between the length and width of such a carton enables the stability of the stack to be increased by varying the patterns in which the cases are assembled in successive layers so that a carton in one layer may overlie portions of two cases in the previous layer. Because of their relatively large size and weight, the achievement of a stable stack of several layers is not too difficult with articles of the foregoing type. However, in recent years, a demand has arisen for the delivery of beer in the so-called "six pack" in which six cans of beer are disposed in two rows of three cans each and wrapped in a relatively thin open ended cardboard container. In attempting to handle cartons of this latter size upon automatic pallet loading machinery, several difficulties have arisen.

First, because of the larger numbers of individual articles within a layer, the possibility of misaligned individual articles increases as does the possibility of damaged containers, such damage usually taking the form of a projecting flap. In addition, because of the reduced length and width of the smaller article units, a problem is encountered during the stripping operation in that the distance which the individual units must drop from the apron onto the pallet or previously deposited layer of articles becomes a substantial portion of the horizontal dimensions of the individual articles.

It is possible to reduce the distance which the individual articles must drop by choosing the level at which the upper surface of the pallet upon the lift or the upper surface of the last deposited layer of articles to be closely beneath the apron. However, this close proximity of the uppermost supported surface on the lift to the path of apron travel creates a problem during the return stroke of the apron and a projecting surface such as a torn carton flap or tilted article from the last deposited layer on the lift. Further, because of the larger number of individual article units in each layer, the achievement of the desired interlocking relationship between adjacent layers becomes more difficult and, because of the increased number of articles, only relatively simple pattern variations can be employed.

It is a primary object of the present invention to provide a pallet loading machine especially designed to assemble a relatively large number of small articles into a stable multi-layer stack upon a pallet.

It is another object of the invention to provide a pallet loading machine operable to increase the stability of multi-layer stack of articles by inserting a stack stabilizing sheet into the stack between successive layers of articles.

Still another object of the invention is to provide a pallet loading machine having a reciprocal apron in which the distance articles must drop from the apron into the stack supported upon a lift is minimized while at the same time the possibility of interference between the apron and stack during the return stroke of the apron is likewise minimized.

Still another object of the invention is to provide a pallet loading machine having an apron assembly in which articles are stripped over the front edge of the apron wherein the front of the apron moves to its retracted stripped position at a first level and is returned to its article receiving position at a higher level.

Still another object of the invention is to provide a pallet loading machine operable to insert stack stabilizing sheets between successive layers of articles by cooperating with the normal movement of the machine apron and wherein the possibility of interference between the articles and edge of the sheet as the sheet is being placed is minimized.

The foregoing, and other objects, are achieved in a pallet loading machine in which a pallet supporting lift is mounted for vertical movement within a lift shaft defined by the machine frame. At the upper end of the lift shaft, an apron is mounted upon the machine frame for movement between an extended article receiving position overlying the upper end of the shaft and a retracted position in which the apron is withdrawn rearwardly from the shaft with the front edge of the apron located adjacent the rear side of the shaft. A stationary stripper bar is mounted upon the machine frame to extend across the rear side of the shaft above the path of movement of the apron at a location such that the bar strips articles from the apron onto the lift during the retracting movement of the apron. When the apron is in its normal article receiving position overlying the lift shaft, the front edge of the apron is supported at an elevation above the rear edge of the apron so that the apron is inclined downwardly and rearwardly across the shaft. Thus, articles to be assembled into the stack are formed into rows near the front side of the lift shaft and are pushed onto the apron surface. The inclined apron surface causes the articles to be gravitationally conveyed to the far or rear side of the apron, the first assembled row of articles being engaged by the stripper bar. The apron is supported upon the machine frame by front and rear roller assemblies projecting outwardly from opposite sides of the apron near the front and rear edges. The apron's rollers are mounted upon tracks in the frame. Upn movement of the apron away from its forward or article receiving position, the front rollers are guided onto a downwardly and rearwardly inclined track section so that the front edge of the apron drops into horizontal alignment with the rearward edge of the apron, thereby minimizing the vertical distance which the articles must drop as they are stripped from the apron. The apron is maintained in a horizontal position throughout the remainder of its retracting movement.

A sheet dispensing mechanism is mounted clear of the rear side of the lift shaft below the path of movement of the apron. The mechanism includes a sheet supply, usually in the form of an elongate roll of paper whose free end is passed through guide mechanism which leads the end of the paper to the rear side of the lift shaft in contact with the lower surface of the apron. Gripper assemblies are mounted below the front edge of the apron in a position such that the free end of the paper web is disposed in operative relationship with the gripper assemblies when the apron is in its retracted position. The gripper assemblies are spring biassed to a closed position, but are opened by stationary cams on the machine frame when the apron is at its fully retracted position. The sheet dispensing mechanism includes means for feeding paper from the supply roll toward the apron when the apron starts to move from its retracted position to its article receiving position. The feeding mechanism maintains the free end of the web in operative relationship with the gripper members until the grippers clear their opening cams and move into gripping relationship to grip the end of the sheet. As the apron begins to return to its extended position, the front apron rollers encounter a forwardly and upwardly inclined track section which rapidly elevates the front edge of the apron up to its original level and the apron is then returned to its fully extended position while maintaining the inclination originally described.

The sheet feeding mechanism continues to feed as the apron moves forwardly across the shaft. At an appropriate point, the web is severed so that the portion gripped by the gripper on the apron assembly is of a length equal to the corresponding length of the last deposited layer of articles deposited upon the shaft. The sheet thus cut from the paper web is so dimensioned as to completely overlie the upper surface of the last deposited layer of articles. The feeding mechanism of the feeding dispenser continues to feed paper from the supply roll until the newly severed end of the web leading from the roll is located at the ready position below the apron surface at the retracted position of the front edge of the apron. The sheet gripped by the apron is conveyed by the apron into overlying relationship with the uppermost layer on stacked articles on the lift. Upon arrival of the apron at its fully extended article receiving position, the gripper assemblies on the apron engage a second set of stationary cams on the frame and the grippers are moved to their open position to release the sheet, which then drops on top of the last deposited layer of articles.

The inclined track section upon which the front rollers move upon forward movement of the apron from the retracted position are pivotally supported upon the frame in a fashion such that retracting movement of the apron carries the front roller means rearwardly of the inclined pivoted track members by merely pivoting them upwardly and thus passing beneath them. Upon forward movement of the apron, the pivoted track sections are held or locked against the reverse pivotal movement, thus forcing the front apron rollers to move upwardly along the inclined sections to an upper track. The upper track extends horizontally from the inclined sections to the position occupied by the front rollers when the apron is fully extended. Just prior to reaching the forward or fully extended position of the apron, the front rollers must pass across an opening which corresponds to the upper end of a forward set of inclined track sections. To carry the front roller means across this opening, each front roller means consists of a first roller rotatably supported directly upon the apron frame. A rearwardly extending arm is pivotally supported on the front roller axle and carries a second roller at its free end. Upon pivotal movement of the rollers at the rear ends of the arms is prevented by a stationary abutment on the apron frame. Thus as the front pair of front rollers pass over the forward incline opening, the front edge of the apron is supported by the respective rollers at the free ends of the arms which have not yet arrived at the opening. By the time these latter rollers move forwardly over the opening, the forward rollers are located beyond the opening to again support the front edge of the apron. On rearward movement of the apron from its extended position, the rollers at the free ends of the arms pass downwardly through the opening and are followed by the front rollers.

Other objects and features of the invention will become apparent by reference to the following specification and drawings.

In the drawings:

FIG. 2 is a top plan view of the machine of FIG. 1, with certain parts broken away or omitted;

FIG. 3 is a detailed cross-sectional view taken on a vertical plane showing details of the sheet dispensing mechanism;

Figure 5:
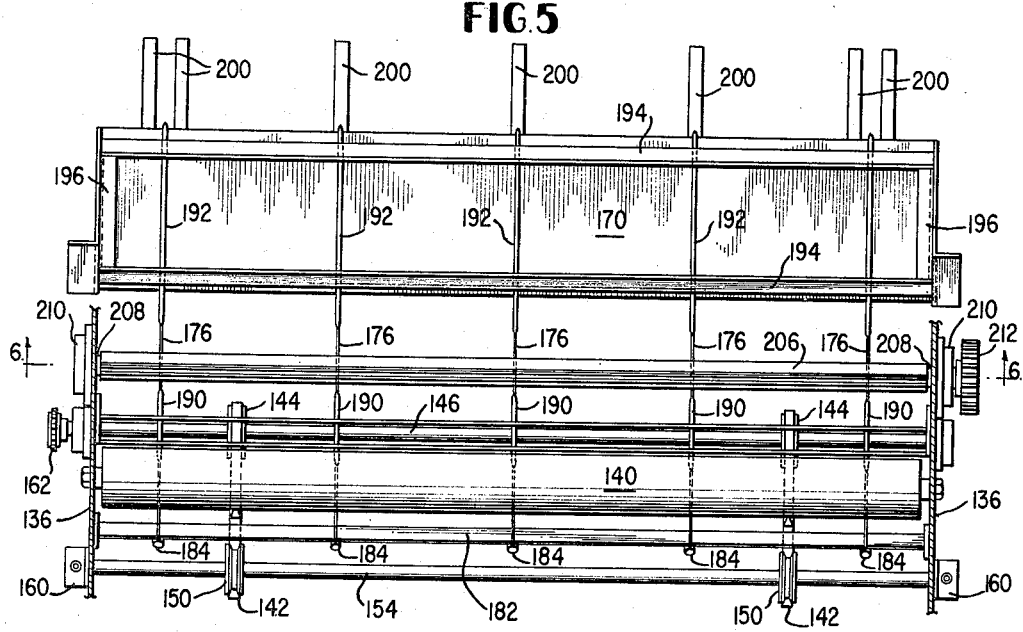
Figure 6:
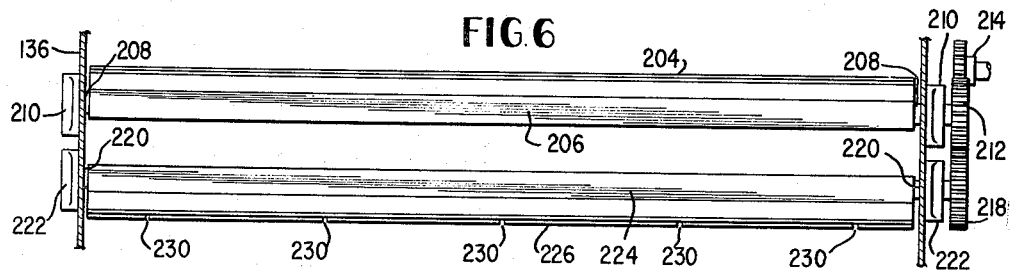
Figure 7:
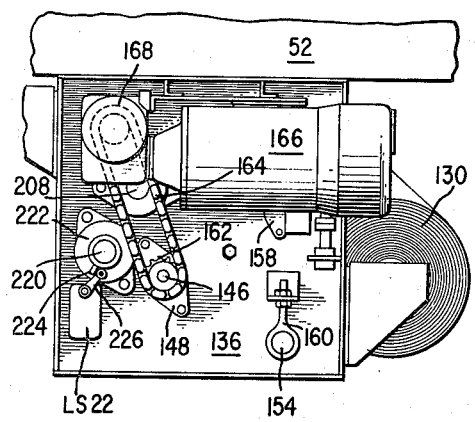
Figure 8:
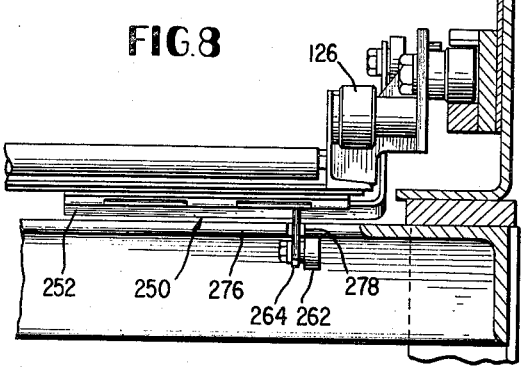

FIGS. 4 and 4a in combination, show a side elevational view with certain parts broken away and others shown in section showing details of the apron supporting structure and portions of the sheet dispenser drive mechanisms, FIG. 4a representing a continuation of FIG. 4 from the points X—X;

FIG. 5 is a cross-sectional view taken on the line 5—5 of FIG. 3;

FIG. 6 is a cross-sectional view taken on line 6—6 of FIG. 5, showing details of the paper severing mechanism;

FIG. 7 is a detailed side elevational view of a portion of the sheet dispenser mechanism taken on the side opposite from that of FIG. 4 and showing details of the paper feed drive mechanism;

FIG. 8 is a detailed cross-sectional view taken on line 8—8 of FIG. 3;

FIG. 9 is a detailed view partially in section showing the forward portion of the apron track assembly with the apron approaching its forward limit of travel;

FIG. 10 is a view similar to FIG. 9 showing the apron at its forward limit of travel;

FIG. 11 is a detailed cross-sectional view taken on the line 11—11 of FIG. 9;

FIG. 12 is a detailed cross-sectional view taken on line 12—12 of FIG. 10; and

Figure 13:
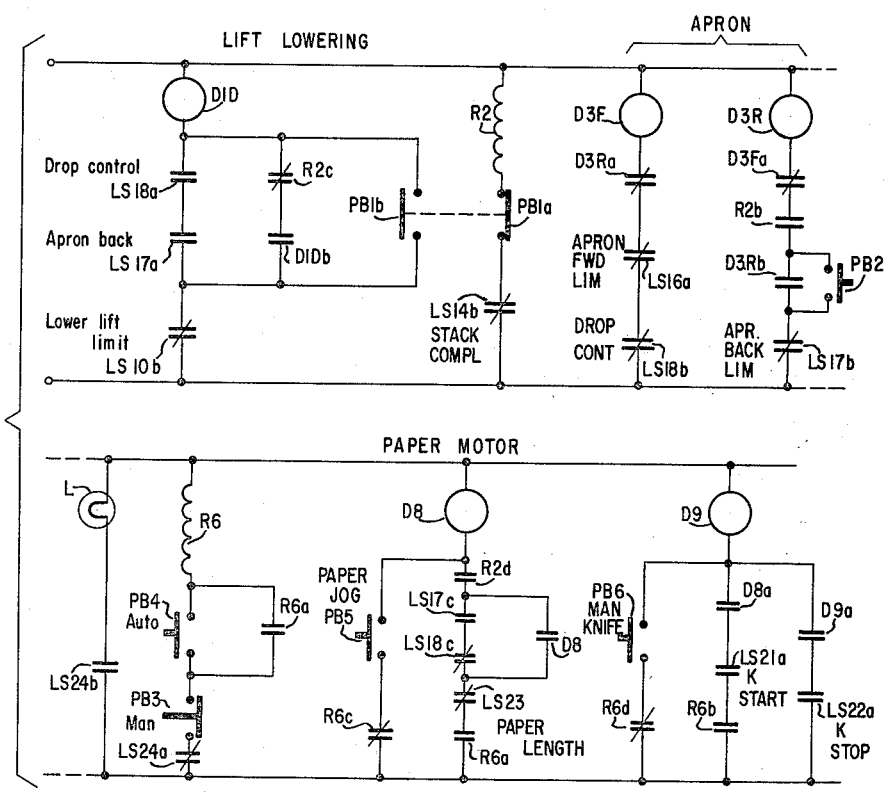

FIG. 13 is a schematic diagram of the electrical control circuit.

Figure 1:
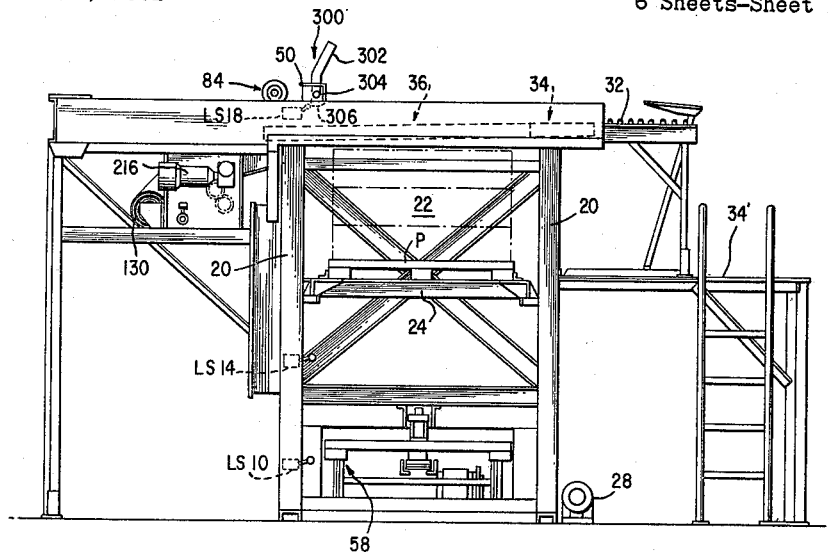
FIG. 1 is an end elevational view of a pallet loading machine embodying the invention.

The invention is shown in FIG. 1 as being applied to a pallet loading machine of the type described and claimed in a copending United States application of Warren S. Raynor, Serial No. 728,243, filed April 14, 1958 (Canadian application Serial No. 727,335, filed April 16, 1957), owned by the assignee of the present application. Since the overall pallet loading machine structure is described in detail in the aforementioned copending application, its structure and operation will be described only generally below with specific reference as to the cooperative relationship of the pallet loading machine structure and operation with the specific improvements to which the present application is directed.

The machine of FIG. 1 includes a frame which includes a plurality of vertical frame members such as 20 which define opposite sides of a vertical lift shaft 22 within which a pallet lift platform 24 is raised and lowered by suitably arranged pallet lift chains 26 (see FIG. 4) which are driven in lift raising and lowering movement by a lift drive motor such as 28. Lift platform 24 is constructed to support a pallet P of conventional construction and the function of the machine is to stack articles in layers upon a pallet supported on lift platform 24.

Articles to be stacked are fed into the machine in line by an infeed conveyer 30 (FIG. 2) which feeds the incoming articles onto a ball transfer table 32 upon which the articles are assembled into a row by an operator standing upon an operator's platform 34. When a row of articles have been assembled upon transfer table 32, the operator manually pushes the row of articles as a unit toward the left, as viewed in FIGS. 1 and 2 and the row of articles passes successively across the surfaces of an intermediate transfer table 34 and an apron designated generally 36. Side guide members such as 38 and 40 (FIG. 2) engage the ends of the rows of articles to longitudinally locate the row upon the apron. As best seen in FIG. 1, the surfaces of intermediate transfer table 34 and apron 36 are inclined downwardly toward the left as viewed in FIGS. 1 and 2 and the upper surface of the table and apron are formed by elongate rollers such as 42 and 44 mounted for free rotation in intermediate table frame 46 and apron frame 48 respectively. When the apron and table are in the position shown in FIGS. 1 and 2, they function as a gravity roller conveyer and the transferred row moves to the left as viewed in these figures until it abuts a stationary stripper bar 50 which extends horizontally between horizontal longitudinal side frame members 52 of the machine frame. The operator continues to assemble rows of articles and transfer them onto apron 36, each row being gravitationally conveyed into side-by-side relationship with the previously transferred row until a sufficient number of rows have been assembled upon the apron to form a layer of articles.

At this time, the layer of articles is ready to be transferred from apron 36 to the pallet P supported on lift platform 24.

The control mechanism of the machine is such that prior to the transfer of the first layer of articles from apron 36 to the pallet on lift platform P, lift platform 24 has been elevated within lift shaft 22 until the upper surface of pallet P is located closely below the lower surface of apron 36, approximately at the level of the upper flange 54 of a frame member 56 (FIG. 4).

To transfer a layer of articles from the apron to the pallet, the control mechanism is actuated to drive apron 36 from the position shown in FIG. 2 to the left to retract apron 36 beneath stripper bar 50 until the front or right hand edge of apron 36 has been withdrawn from lift shaft 22 to the position shown in FIG. 4. This action causes stripper bar 50 to strip the layer of articles from the surface of apron 36 and deposit the articles upon the pallet. The control system of the machine then automatically lowers pallet lift platform 24 until the upper surface of the layer of articles supported upon the pallet is lowered to the level previously occupied by the upper surface of the pallet. This action lowers the deposited articles below the path of the apron which is then automatically returned to the position of FIGS. 1 and 2 to receive a subsequent layer of articles. The machine operator then assembles another layer of articles upon apron 36 and the control mechanism is actuated to deposit a second layer of articles upon the first deposited layer of articles upon the pallet and this operation is cyclically repeated until the desired number of layers of articles have been stacked upon each other upon the pallet.

At this time, the machine is operated to lower the lift platform 24 to transfer support of the now loaded pallet P to a pallet conveyer 58 (FIG. 1) which automatically conveys the loaded pallet from lift shaft 22 and places an empty pallet in position upon lift platform 24 for a repetition of the foregoing cycle.

Apron 36 is supported for movement by a front roller assembly 60 mounted on each side of apron frame 48 adjacent the front edge of the apron and rear roller assemblies 62 mounted on each side of the apron frame at the rear edge of the apron. The roller assemblies at each side of the apron are supported upon apron tracks fixedly secured to the inner sides of longitudinal side frame members 52 of the apron frame. Each apron track is formed with a lower horizontal section 64 which extends forwardly from the rear end of member 52 (left hand end FIG. 4) forwardly to a front end 66 (FIG. 4a) which terminates slightly to the rear (left in FIG. 4a) of the forward side of the lift shaft (defined by the right hand vertical frame member 20 in FIG. 4a).

An upper horizontal track section 68 is mounted upon each frame member 52 to extend along the opposite sides of the lift shaft between a rear end 70 spaced somewhat forwardly from the rearward side of lift shaft 22 (FIG. 4) to a forward end 72 which is located substantially at the front side of lift shaft 22 (FIG. 4a). At a location slightly to the rear of front end 72 of upper track section 68, a downwardly and rearwardly inclined track section 74 extends from upper track 68 to the forward end of 66 of lower track 64. At the rearward end of upper track section 68, a pivoted track section 76 is pivotally coupled to the rearward end of track section 68 as by a pivot pin 78. Pivoted track section 76 normally rests upon lower track section 64 as shown in FIG. 4 and, when in the FIG. 4 position, defines an upwardly and forwardly inclined transition between lower track section 64 and upper track section 68.

Rear roller assembly 62 consists of a simple roller rotatably journaled on apron frame 48. Rear rollers 62 may conveniently be mounted upon the outer ends of drive shafts 80 and 82 which are driven in rotation by a motor and reduction gear assembly designated generally 84 mounted upon the rear apron frame member 86 and movable bodily with the apron. Drive shafts 80 and 82 respectively drive pinions 88 and 90 which are meshed with stationary racks 92 fixedly mounted upon longitudinal side frame members 52 of the machine frame. The motor and reduction gear assembly 84 is reversible and its energization and direction of rotation is controlled by the machine control system to drive the apron between its article receiving position shown in FIGS. 1 and 2 and fully retracted position shown in FIG. 4.

The control system of the machine interrelates operation of the lift to locate lift platform 24 at a level within the shaft such that the uppermost surface supported on platform 24—either the upper surface of pallet P or the top surface of the uppermost layer of articles supported upon the pallet—is located closely beneath the path of movement of apron 36. This location is preferably as high as possible to minimize the distance which articles must drop when they are stripped from the apron surface by retraction of the apron to the position of FIG. 4. Upon the depositing of the layer of articles, lift platform 24 is lowered until the top surface of the last deposited layer of articles is positioned below the path of movement of apron 36 and the control system then actuates drive assembly 84 to return the apron to its fully extended position to receive the next subsequent layer of articles.

The apron supporting track structure described above is especially devised to avoid problems of interference with the apron movement by projecting carton flaps in those situations where the articles stacked on the pallet consist of cardboard cartons. This problem is frequently encountered in environments where the articles stacked consist of cartons such as those employed to handle bottles or canned beer, and is especially prevalent in situations where the articles handled consist of so called "six packs" having an integrally formed carrying handle. The problem is overcome by cooperatively relating front roller support means 60 to the lower and upper track sections 64 and 68 in a fashion such that return movement of apron 36 from the retracted position of FIG. 4 finds front roller supports 60 traveling upon upper track section 68, at a level well above the upper surface of the layer of articles in the lift shaft, and transferring support of front roller assembly 60 to lower track section 64 during the rearward movement of apron 36 in which the stripping of articles from the apron takes place, thus locating the apron surface closer to the uppermost layer of articles upon the lift.

To accomplish this, front roller support means 60 is formed as a two-wheel bogie, the forward wheel 100 of which is rotatably supported on an axle 102 mounted upon a mounting ear 104 (FIGS. 11 and 12) fixedly secured to apron frame 48. The rear wheel 106 of the bogie is rotatably supported at the distal end of an arm 108 which is pivotally supported at its forward end upon axle 102. Thus, as thus seen by comparing FIGS. 9 and 10, arm 108 can pivot freely about axle 102. Upward pivotal movement of arm 108 about axle 102 above the horizontal is prevented by a lug 110 fixedly mounted on ear 104 and engageable with the upper surface of arm 108 when the arm projects horizontally from axle 102. Referring now particularly to FIGS. 9 and 10, in FIG. 9 apron 36 is shown approaching its forwardly extended position with front roller 100 and rear roller 106 of the front bogie supported upon upper track 68. Movement of apron 36 to the right from the FIG. 9 position advances front roller 100 over the upper end of the opening defined by inclined track section 74. As front roller 100 passes across this opening, the front edge of the apron is supported entirely by rollers 106 which are still supported upon track 68 and by the engagement between arm 108 and lug 110 which prevents front roller 100 from dropping downwardly onto inclined track section 74. Continued forward movement of apron 36 advances front roller 100 onto the forward extension 72 of upper track 68 and apron 36 continues to move forwardly until rear roller 106 is carried into engagement with inclined track section 74. The front edge of the apron is shown in its forwardly extended article receiving position in FIG. 10.

On rearward movement of apron 36 (to the left as viewed in FIG. 10) rear bogie roller 106 is free to move downwardly along inclined track section 74 since arm 108 is free to pivot downwardly (in a counterclockwise direction as viewed in FIG. 10) about axle 102. Continued rearward movement of apron 36 causes front bogie roller 100 to follow its rear roller 106 down inclined section track 74 and thus support of front roller assembly 60 is transferred from upper track 68—72 to lower track 64—66 during the initial portion of the movement of the apron away from its fully extended position.

Referring now to FIG. 4, as the apron approaches its retracted position, rear bogie roller 106 strikes the right hand side of pivoted track section 76, and track section 76 pivots upward freely to permit the front roller assemblies 60 to pass rearwardly beyond the track section. When the front roller assemblies pass to the rear of track section 76, the section pivots downwardly by the action of gravity to return to the FIG. 4 position. This downward pivoting movement may be cushioned by projecting track pivot pin 78 outwardly beyond the outer side of frame member 52 and fixing a crank arm 116 to the projecting portion of pin 78. The end of crank arm 116 is coupled to a dash pot 118 mounted on frame member 52.

Upon forward movement of apron 36 from the FIG. 4 position, front roller assembly rides directly up inclined track section 76 onto the surface of upper track 68 and thus the forward edge of the apron is held elevated well above the surface of articles in the lift during return movement to its extended position.

As described in greater detail in the above-identified co-pending application, intermediate transfer table 34 is pivotally mounted on the machine frame as by a pivot shaft 120. When apron 36 is away from its fully extended position, the frame of intermediate table 34 pivots downwardly to the FIG. 4a position at which it is supported by a fixed frame member 122. A fixed stop 124 projects above the upper surface of rollers 42 when table 34 is in the FIG. 4a position so that a row of articles can be assembled on the table during the article stripping operation on apron 36. A forwardly projecting shoe 125 fixed to the frame of table 34 is engaged by a roller 126 (FIG. 12) on the apron frame when the apron returns to its extended position to elevate intermediate table 34 to the FIG. 10 position.

In order to increase the stability of the stack when articles of relatively small size are being handled, the machine shown in the drawings is provided with a sheet dispensing mechanism which is operable to place a sheet of paper or other suitable material on top of each layer of articles after the articles are deposited upon the lift. The overall arrangement of the mechanism for supplying the stack stabilizing sheets to the machine are best shown in FIG. 3.

The sheets are supplied from an elongate web of sheet material which is preferably supported in a supply roll 130 rotatably supported in spaced axle receiving troughs 132 fixedly mounted upon the machine frame. The free end of the web from supply roll 130 is trained over a tensioning roll 134 rotatably supported in spaced dispensing frame side plates 136 and mounted for vertical tensioning adjustment in a conventional manner.

From tensioning roll 134 the free end of the supply web from roll 130 passes downwardly along the right hand (FIG. 3) side of a curved guide plate 138 into the web feeding mechanism in which the web is engaged between the periphery of an idler roll 140 rotatably supported between side plates 136 and the outer side of a pair of feed belts in the form of V belts 142. As best seen in FIG. 5, two V belts 142 are employed at locations spaced somewhat inwardly from the respective side plates 136. Referring now to FIG. 3, each feed belt 142 is operatively trained around a drive sheave 144 fixedly secured to a drive shaft 146 rotatably supported as by bearing assemblies 148 (FIGS. 4 and 7) in side plates 136. From drive sheave 144, each belt 142 is trained around idler sheaves 150 and 152 respectively mounted on shafts 154 and 156. Shaft 156 is rotatably supported as by bearing assemblies 158 mounted on side plates 136, while shaft 154 is supported upon an adjustable bearing such as 160 to provide tensioning adjustments for belts 142. The various sheaves 144, 150 and 152 are mounted at axially spaced locations on their respective shafts. Drive shaft 146 projects beyond the left hand side plate 136 (FIG. 7) and a drive sprocket 162 is fixedly secured to the projecting end of shaft 146 to be driven by a chain 164 which is in turn driven by web feed motor 166 through a gear reduction box 168.

From the web feeding mechanism, the free end of the web passes through a paper guide assembly which includes a main guide plate 170 fixedly secured to integral side angles 172 on the front side of each side plate 136 in an upwardly and forwardly inclined position. The end of plate 170 facing the web feeding mechanism is bent downwardly as at 174 to deflect the end of the web upwardly onto the upper surface of plate 170 during the feeding operation.

Support for the web between feed roller 140 and edge 174 of plate 170 is provided by five support wires 176. Each of wires 176 is secured to plate 170 by passing the end of the wire downwardly through plate 170 and clamping the end of the wire to an angle member 178 welded to the lower surface of plate 170 by a clamping screw 180.

As best seen in FIG. 3, the opposite end of each wire 176 passes downwardly below the periphery of feeding roll 140 and is trained over one edge of an angle member 182 fixedly secured and extending between side plates 136. The end of each wire 176 is passed through a diametral bore in one end of a threaded stud 184 which can be adjusted relative to angle 182 as by lock nuts 186. Adjustment of stud 184 is employed to apply the desired amount of tension to support wires 176 As best seen in FIG. 5, wires 176 are uniformly spaced across the width of the machine.

In addition to plate 170 and wires 176, the web is guided from above by a lower guide assembly which includes a pair of elongate plates 188 which extend laterally between side plates 136 and support a series of spaced guide rods 190 which extend longitudinally of the direction of travel of the web. An upper series of guide rods 192 in opposed relationship to plate 170 are supported by a frame which includes a pair of angle members 194 connected by side plates 196. Side plates 196 may be adjusted to locate guide rods 192 at a selected spacing from guide rod 170 by clamping side plates 196 to member 172 at selected positions by clamp nuts 198. After passing upwardly through the space between guide plate 170 and upper guide rod 192, the free end of the web passes over a set of spring fingers 200 which resiliently bias the web upwardly against the lower surface of apron 36 which, as best seen in FIG. 3, is formed by a continuous smooth metal sheet 202.

In addition to the feeding and guiding structure described above, the sheet dispensing mechanism includes a severing mechanism for cutting sheets from the supply roll of a length adapted to overlie a layer of articles supported upon the lift. The severing mechanism includes an elongate knife blade 204 mounted in a support block 206. Support block 206 is supported for rotation by projecting stub shafts 208 rotatably supported on plates 136 as by bearing assemblies 210. Stub shaft 208 at the right hand side of the machine (FIGS. 5 and 6) projects beyond its bearing 210 and a pinion gear 212 is fixedly mounted on the projecting shaft and meshed with the driving gear of a reduction gear assembly 214 which is operatively connected to be driven by knife drive motor 216 (FIG. 4).

As best seen in FIGS. 4 and 6, pinion 212 on shaft 208 is meshed with a second pinion 218 rigidly fixed to one end of a shaft 220 rotatably supported in side plates 136 as by bearing assemblies 222. Shaft 220 is fixedly secured to a support block 224 which carries a resilient back up member 226. The location of the axes of shafts 208 and 220 relative to each other and the dimensions of their respective support blocks are such that upon rotation of the shaft, back up member 226 is rotated into engagement with the lower surface of the web at the same time that the cutting edge of knife 204 is rotated into engagement with the upper surface of the web in opposed relationship to back up member 226. The location of the cutting edge of knife 204 is such that the knife merely brushes across the upper surfaces of support wires 176 while back up member 226 is notched as at 230 so that the back up member projects upwardly between wires 176 when rotated about shaft 220 180° from the position shown in FIG. 3. Because of the direct meshing engagement between pinions 212 and 218, the knife and back up member are rotated simultaneously and in phase with each other in opposite directions of rotation. The direction of rotation of knife member 204 is in a counterclockwise direction about the axis of shaft 208 as viewed in FIG. 3, while the direction of rotation of back up member 206 is in a clockwise direction about the axis of its shaft 220 as viewed in FIG. 3.

Referring now to FIG. 7, the end of shaft 222 remote from pinion 218 projects laterally beyond its associated bearing 222 and a radially projecting lug 224 is rotatable with the shaft. A limit switch LS22 is mounted upon side plate 136 as shown in FIG. 7 in a position such that its striker 226 is located to be engaged and deflected by lug 224. Limit switch LS22 is connected in the electrical control circuit for knife drive motor 216 in a fashion such that the knife and back up member are driven in a single complete revolution upon each actuation of motor 216.

A pair of sheet gripping assemblies designated generally 250 are mounted on the lower side of apron 36 closely adjacent the front edge of the apron. Each assembly 250 includes a plate-like gripping member 252 which is hingedly supported at its forward edge on the lower surface of the apron as by hinge assembly 254.

Referring now particularly to FIGS. 11 and 12, at the inner end, relative to the side of apron 36, of member 252, a roughened gripping pad 256 is secured on the upper surface of member 252. Member 252 is extended beyond the side edge of apron 36 and the extended portion is bent upwardly to form an upwardly projecting generally triangular ear 258. A roller 260 is rotatably mounted at the upper end of ear 258 and a second roller 262 is rotatably mounted at the lower end of a lug 264 which projects downwardly from the lower side of plate 252.

Referring now to FIGS. 3 and 11, gripping plate 252 is normally biased upwardly about hinge 254 to locate gripper pad 256 in gripping engagement against the lower surface of apron plate 202 by a compression spring 266 which is seated above the lower flange of apron frame member 48 and beneath a plate 268 carried at the upper end of a rod 270 which passes freely through a bore in the flange of apron frame member 48 and is formed with a head 272 which bears against the lower surface of plate 252. Rollers 260 and 262 are employed to move gripper assembly 250 to its open position when the apron is at its fully retracted or fully extended position.

As best seen in FIG. 3, gripper plate 252 is pivoted downwardly to open the gripper assembly when the apron is in its retracted position by the engagement between roller 262 and a frame flange 276. Flange 276 is slotted as at 278 (FIG. 8) to permit lug 264 to pass rearwardly beyond the front end of the flange. Gripper assembly 250 is opened in the fully extended position of the apron by the engagement between roller 260 and an opening abutment 280 mounted upon side frame member 52.

Operation of the sheet dispensing mechanism is controlled by the electrical control circuit of FIG. 13. Since operation of the sheet dispensing mechanism is interrelated with the normal operation of the pallet loading machine, the electrical circuit of FIG. 13 also includes in simplified form, certain portions of the electrical control circuit disclosed in the above-identified Raynor application Serial No. 728,243 relating to the control of the lowering of pallet lift platform 24 and the forward and retracting strokes of apron 36. Contact designations employed in FIG. 13 correspond to those employed in the forementioned Raynor application, although the circuit of FIG. 13 has been simplified and does not include all of the contacts or circuit branches shown in the co-pending application.

To briefly review the common circuit components between the present application and the co-pending application, operation of the pallet lift insofar as its lowering movement is concerned is primarily controlled by three limit switches, LS10, LS14, and LS18, the physical location of these switches being shown on FIG. 1. Limit switch LS10 functions to detect the arrival of lift platform 24 at its lowermost limit of movement. Limit switch LS14 is located upwardly of lift shaft 22 from LS10 at a location such that the striker of limit switch LS14 is engaged by lift platform 24 when a complete stack of articles has been assembled upon the pallet P.

Limit switch LS18 functions to control lowering of lift platform 24 during the assembly of the stack and is operated by a lift drop control assembly designated generally 300 which includes an arm 302 pivotally mounted as at 304 upon stripper bar 50. Arm 302 is normally mechanically latched in the position shown in FIG. 1 by suitable structure, not shown, and upon movement of apron 36 to its fully retracted position, the arm holding latch is released. Release of the latch permits arm 302 to rotate in a clockwise direction as viewed in FIG. 1 about its pivot 304 until the outer end of the arm contacts the top of the layer of articles deposited on the lift by the latch releasing retracting movement of apron 36. As the lift is lowered, in a manner to be described below, the outer end of arm 302 remains gravitationally in contact with the upper surface of the layer of articles.

When the top of the layer of articles has been lowered below the path of movement of apron 36, a cam 306 which swings about pivot 304 with arm 302 actuates limit switch 18 to halt further lowering movement of the lift. Arm 302 is mechanically returned to the FIG. 1 position during the return of the apron to the extended position of FIG. 1.

In addition to the foregoing limit switches, the normal control circuit of the pallet loader includes limit switches LS16 and LS17 (FIG. 4) which are located on one of the machine side frame members to be contacted by an upwardly projecting arm 308 mounted upon and movable with apron 36. The striker of LS17 is contacted by arm 308 when the apron is in its fully retracted position, and limit switch LS16 is located so that its striker is contacted by arm 308 when the apron is in its fully extended position.

Limit switches employed to control the sheet dispensing mechanism include limit switches LS21 and LS23 (FIG. 4) mounted on side frame member 52 to have their strikers contacted by arm 308 at selected positions of the apron between its fully extended and fully retracted position. Limit switch LS22 (FIG. 7) is employed in conjunction with the knife rotating structure as described above, and a limit switch LS24 (FIG. 3) is employed to detect crumpling, snagging or tearing of the paper web.

In addition to the various limit switches referred to above, various manually actuated pushbuttons are employed to initiate various operations or to override the control circuit. These pushbuttons are mounted in a control panel, not shown, readily accessible to the machine operator.

The various contacts shown in FIG. 13 are identified with reference numerals which include the reference numeral of their controlling switch or relay. Normally open contacts are indicated by two parallel lines, while normally closed contacts are indicated by two parallel lines with a diagonal line. A contact indicated as being normally open is open when its associated relay is de-energized and closed when its associated limit switch striker is depressed or when its controlling relay is energized.

Operation of the machine under the control of the circuit of FIG. 13 is as follows. As an initial condition, it will be assumed that lift platform 24 is located at the upper end of the lift, immediately beneath path of movement of apron 36, with an empty pallet supported upon it; apron 36 is in its fully extended article receiving position shown in FIG. 1 and a paper supply roll is mounted in the sheet dispensing mechanism with the free end of the roll located in contact with the lower surface of the apron at the outer ends of spring fingers 200 (FIG. 3).

When the operator has assembled a full layer of articles upon apron 36, the transferring of the layer of articles from apron 36 to pallet P is initiated by the action of the operator in manually depressing pushbutton PB2 (FIG. 13) to energized a control relay D3R which energizes apron drive motor assembly 84 to drive the apron from its fully extended position toward its retracted position. Apron control relay D3R is energized through the normally closed contacts LS17b which are closed at this time because the apron is away from its fully retracted position, contacts R2b, which are closed because their controlling relay R2 is energized at this time, and normally closed contacts D3Fa which are closed because their controlling relay D3F is de-energized at this time. Control relay R2 may be referred to as the full lift drop relay since it operates to continuously lower the lift to the bottom of the lift shaft upon normally closed contacts LS14b and normally closed pushbutton contacts PB1a.

When apron control relay D3R is energized by the momentary depression of pushbutton PB2, it closes contacts D3Rb which bypass the contacts of pushbutton PB2, and control relay D3R remains energized to drive the apron toward its retracted position until contacts LS17b are opened by the arrival of the apron at its fully retracted position.

Arrival of the apron at its fully retracted position mechanically unlatches drop control arm 302 as described above and energizes lift control relay D1D by closing contacts LS17a. The configuration of cam 306 on drop control arm 302 is such that the striker of limit switch LS18 is depressed at all times except when the lift is lowered to the desired position. Thus, the energizing circuit to lift lowering relay D1D is through normally closed contacts LS10b, closed because the lift is away from its fully lowered position, contacts LS17a, closed by the arrival of the apron at its fully retracted position, and contacts LS18a, which are closed by the depression of the striker of limit switch LS18 prior to the arrival of the lift at the desired elevation. Energization of lift control relay D1D energizes lift drive motor 28 to lower the lift until downward movement of the outer end of lift control arm of 302 pivots cam 306 to a position at which the striker of limit switch LS18 is released to thereby open the contacts LS18a. This action automatically initiates the return of apron 36 toward its fully extended position by permitting contacts LS18b to close to energize apron control relay D3F through normally closed contacts LS16a, closed because the apron is away from its fully extended position, and contacts D3Ra which are closed because the apron retract control relay D3R is de-energized.

At this stage in the cycle, the sheet dispensing mechanism is actuated to feed the end of the paper web to the gripping mechanism on the apron to be carried across the lift shaft by the return stroke of the apron.

The sheet dispensing control circuit includes a main relay R6 which is energized to condition the circuit for manual or automatic operation by two manually actuated pushbuttons PB3 and PB4. Pushbutton PB3 is normally closed while pushbutton PB4 is normally open and is of the momentary depression type of switch which is bypassed by contacts R6a to lock relay R6 in upon a momentary depression of pushbutton PB4. With the contacts PB3 closed, the sheet dispensing control circuit is conditioned for automatic operation by momentarily depressing pushbutton PB4 to energize relay R6 through the normally closed contacts of limit switch LS24, which are closed at all times except when crumpling or tearing of the paper sheet occurs, and the normally closed contacts of manual pushbutton PB3. With relay R6 energized, contacts R6a are closed and, upon the arrival of lift platform 24 at the desired level within the shaft, paper drive motor 216 is energized upon the energization of its control relay D8 through contacts LS18c, closed by drop control arm 302 by the arrival of the lift at the desired level, through contacts LS17, which are closed by virtue of the location of the apron in its fully retracted position, and by contacts R2d, closed at all times prior to the completion of the stacked articles upon lift platform 24.

Energization of paper drive motor control relay D8 causes motor 216 to drive in a direction driving V belts 142 to feed paper from supply roll 130 toward spring fingers 200. The speed at which the paper is fed is the same as the velocity of movement of apron 36 toward its extended position, and hence the end of the paper web projected through the guide means beyond spring fingers 200 remains in the same relationship to gripper assembly 250 as that shown in FIG. 3 during the initial period of travel of the apron from its retracted position. Movement of the apron to the right as viewed in FIG. 3 carries roller 200 beyond the right-hand end of flange 276, and as soon as roller 262 clears flange 276, the gripper plates 252 are pivoted upwardly about hinge 254 by the action of springs 266 so that the ends of the paper web is clamped against the lower surface of apron bottom sheet 202. Thus, as the apron moves across the shaft toward its fully extended position, the paper web is fed from supply roll 130 by movement of V belts 142 at the same speed as that in which the apron is moving, with the end of the paper web gripped against the front edge portion of the apron by the movement of gripper assemblies 250 to their closed position.

As the apron continues to move to the right as viewed in FIGS. 3 and 4, arm 308 of the apron is advanced into engagement with the striker of limit switch LS21. As arm 308 depresses the striker of limit switch LS21, the knife driving motor 166 is energized by energization of its control relay D9. This energization is accomplished through relay contacts R6b, closed because relay R6 is energized, contacts LS21a closed upon the depression of striker limit switch LS21, and contacts D8a which are closed upon energization of paper control relay D8. Energization of motor 166, caused by energization of relay D9 causes the knife motor to drive to simultaneously rotate knife 204 and back up member 226 about the axes of their respective shafts 208 and 220 to cut the paper web upon rotation of the knife and back up member through 180° from the FIG. 3 position, as described above, so that the portion of the web whose end is gripped at this time by gripper members 250 is of a length substantially equal to the front to rear width of the layer of articles deposited upon pallet lift platform 24. The length at which the web is severed is determined by the location of limit switch LS21 in a right to left direction as viewed in FIG. 4. When the severing knife 204 and back up member 226 have been rotated to the position indicated in FIG. 3, lug 224 engages the striker of limit switch LS22 (FIG. 7) to open contacts LS22a and de-energize relay D9 to stop further driving action of knife drive motor 166. Relay D9 remains energized for a complete single revolution after contacts LS21a open by virtue of the movement of arm 308 beyond the striker of the limit switch LS21 through the circuit which includes contacts LS22a and contacts D9a, energized by energization of relay D9 so that stopping of motor 166 is controlled by the de-energization of relay D9 upon the opening of contacts LS22a.

Paper feed drive motor 216 remains energized during the severing operation and continues to feed paper toward spring fingers 200 until arm 308 on apron 36 engages and depresses the striker of limit switch LS23. When the striker of limit switch LS23 is engaged by arm 308, contacts LS23a are opened to de-energize control relay D8 to stop the paper drive motor. Limit switch LS23 is positioned laterally along the path of movement of apron 36 at a location such that subsequent to the severing operation the severed end of the paper web from supply roll 130 is advanced to the ready location at the rearward side of the lift shaft adjacent the retracted position of gripper assemblies 250.

When the apron arrives at its fully extended position, the striker of limit switch LS16 is depressed to open contacts LS16a, de-energize relay D3F, and thereby de-energize apron drive assembly 84.

The foregoing cycle of assembling a layer of articles upon the apron, transferring the articles to the lift and dispensing the sheet of stack stabilizing material from the sheet dispensing mechanism is repeated until a completed stack is formed. The number of layers necessary to form a complete stack is determined by the vertical location of limit switch LS14 on the side of the lift shaft. This location is chosen to be such that during the lowering movement of the final layer of the stack, platform 24 engages and depresses the striker of limit switch LS14 to open contacts LS14b in the control circuit of FIG. 13. Opening of contact LS14b opens the circuit to relay R2, thereby closing contacts R2c which, through contacts D1Db which are closed because of the energization of relay D1D bypasses lift drop control contacts LS18a to maintain lift lowering relay D1d energized to cause the lift to be moved in continuous lowering movement until the lift arrives at its lower limit, at which time contacts LS10b are open to de-energize relay D1D.

De-energization of relay R2 is also employed to prevent operation of the sheet dispensing mechanism and thereby omit the placing of a stack stabilizing sheet upon the uppermost layer of the completed stack. This action is accomplished by the de-energization of relay R2 which opens contacts R2d in the supply circuit to paper drive motor control relay D8, thereby preventing operation of the paper drive after the depositing of the final layer in the stack so that when gripper assemblies 250 close during subsequent movement of the apron to its extended position, the end of the paper web is not disposed between the gripper members and the bottom of the apron. Knife motor 166 cannot be energized since its energization requires the closing of contacts D8a, which cannot be closed unless the paper motor control relay D8 is energized.

The control circuit of FIG. 13 includes provisions for manually actuating both the paper drive motor and knife motor to assist in initially threading paper from spiral 130 into position in the sheet dispensing mechanism. To condition the sheet dispensing control circuit for manual operation, pushbutton PB3 is momentarily depressed to open the circuit to relay R6. With relay R6 de-energized, contacts R6c and contacts R6d are closed while R6a and R6b are open. A pushbutton PB5 in series with contacts R6c may be manually depressed to manually energize paper motor control relay D8 as desired. In the usual case, pushbutton PB5 is employed when initially threading a web of paper from a fresh supply roll 130 into the sheet dispensing mechanism to intermittently jog the paper forward through the guide means. During the threading operation, it is frequently desirable to trim the end of the paper web being threaded through the guide means, and this may be accomplished by depressing pushbutton PB6 to energize knife control relay D9. A momentary depression of pushbutton PB6 causes knife motor 166 to drive the knife and back up member through a complete single revolution in the same fashion as the automatic operation.

As long as the web of paper from supply roll 130 is in good condition, the striker of limit switch LS24 remains unactuated. Should the paper fail to feed through the guides at 170 and become crumpled at feed roller 140, limit switch LS24 is actuated to close LS24b which is connected to energize an indicator light L to notify the operator of the malfunction. This actuation of limit switch LS24 automatically de-energizes relay R6 by opening contacts LS24a to break the circuit to relay R6, thereby preventing any actuation of the sheet dispensing mechanism except by manual operation of push buttons PB5 or PB6.

It will be noted that the apron track assembly described above is especially adapted for use with the sheet feeding mechanism disclosed in this application in that during that portion of the operation in which one end of the paper sheet is carried across the shaft by the return movement of apron 36, the leading end of the sheet is elevated to prevent the snagging and tearing of the paper sheet by carton flaps which may project upwardly from the last deposited layer.

While one embodiment of the invention has been described above, it will be apparent to those skilled in the art that the disclosed embodiment may be modified. Therefore, the foregoing description is to be considered exemplary rather than limiting, and the true scope of the invention is that defined in the following claims.

I claim:

1. A pallet loading machine comprising a pallet lift vertically movable within a lift shaft, an apron mounted for forward and rearward movement across said lift shaft between a forwardly extended article receiving position overlying said lift and a retracted position withdrawn rearwardly from said shaft with the front edge of said apron located adjacent the rearward side of said shaft, means operable when said apron is in said extended position for assemblying a layer of articles upon said apron, means operable upon movement of said apron from said extended position to said retracted position for stripping articles from said apron and depositing the articles in a layer upon said lift, a supply of sheet material located adjacent the rearward side of said shaft, and means on said apron responsive to movement of said apron from said retracted position to said extended position to withdraw a web of sheet material from said supply and to deposit the withdrawn web of sheet material in overlying relationship with the layer of articles deposited on said lift.

2. A pallet loading machine comprising a pallet lift vertically movable in a lift shaft, an apron mounted for forward and rearward movement across said lift shaft between a forwardly extended article receiving position overlying said lift and a retracted position withdrawn rearwardly from said shaft with the front edge of said apron located adjacent the rearward side of said shaft, means operable when said apron is in said extended position for assembling a layer of articles upon said apron, means operable upon movement of said apron from said extended position to said retracted position for stripping articles from said apron and depositing the articles in a layer upon said lift, means responsive to movement of said apron from said retracted position to said extended position for depositing a stack stabilizing sheet upon the upper surface of the layer of articles on said lift, control means for driving said lift and said apron in repeated cycles of coordinated movement to assemble a multi-layer stack of articles upon said lift with a stack stabilizing sheet interposed between adjacent layers of articles, and means responsive to the depositing of the final layer of articles in a completed stack for preventing operation of said sheet depositing means in response to the next subsequent movement of said apron from said retracted position to said extended position.

3. A pallet loading machine comprising a pallet lift vertically movable in a pallet lift shaft, an apron mounted for forward and rearward movement across said shaft between a forwardly extended article receiving position overlying said lift and a retracted position withdrawn rearwardly from said shaft with the front edge of said apron located adjacent the rearward side of said shaft, means operable when said apron is in said extended position for assembling a layer of articles upon said apron, means operable upon movement of said apron from said extended position to said retracted position for stripping articles from said apron and depositing the articles in a layer upon said lift, an elongate web of sheet material, means guiding a free end of said elongate web to a ready location adjacent the rearward side of said shaft below the path of movement of said apron, sheet gripping means mounted on the lower side of said apron adjacent the front edge thereof, and means responsive to movement of said apron away from said retracted position for feeding the free end of said web to said gripping means to be gripped and carried across said shaft thereby above the layer of articles deposited on said lift, severing means for severing said web at a distance from said free end substantially equal to the front to rear dimension of the layer of articles deposited upon said lift, and means responsive to the arrival of said apron at said extended position for releasing the severed portion from said gripping means to deposit the severed portion of said web in overlying relationship upon the layer of articles on said lift.

4. A pallet loading machine as defined in claim 3 comprising control means for driving said lift and said apron in coordinated repeated cycles of movement to assemble a multi-layer stack of articles upon said lift with a web of sheet material interposed between adjacent layers of articles, and means operable by said control means for preventing operation of said web feeding means following the depositing of the final layer of articles in said stack.

5. A pallet loading machine comprising a pallet lift vertically movable in a pallet lift shaft, an apron mounted for forward and rearward movement across said lift shaft between a forwardly extended article receiving position overlying said lift and a retracted position withdrawn rearwardly from said shaft with the front edge of said apron located adjacent the rearward side of said shaft, means operable when said apron is in said extended position for assembling a layer of articles on said apron, means operable upon said movement of said apron to said retracted position for stripping articles from said apron and depositing the articles in a layer upon said lift, an elongate web of sheet material supported in a supply roll below the path of movement of said apron rearwardly of the rearward side of said shaft, web guiding means for guiding the free end of said web from said roll to a location adjacent and below the retracted position of the front edge of said apron, gripping means mounted on the lower side of said apron adjacent the front edge thereof, means operable upon movement of said apron away from said retracted position for actuating said gripping means to grip the free end to carry the end portion of the web across said lift shaft above the layer of articles deposited thereon upon movement of said apron to said extended position, means operable during movement of said apron toward said extended position for severing said web at a location between said roll and the gripped end of said web such that the severed portion of said web is formed into a sheet adapted to overlie the layer of articles, and means operable upon the arrival of said apron at said extended position for releasing the sheet from said gripping means.

6. A pallet loading machine as defined in claim 5 including means operable subsequent to the severing of said web for advancing said web from said roll through said guiding means until the severed end of the web is located at said ready location.

7. In a pallet loading machine having a pallet lift vertically movable within a pallet lift shaft, an apron assembly operable in a first position overlying said lift to receive a layer of articles and operable upon movement to a second position horizontally offset from said lift shaft to deposit the layer of articles on said lift, and control means for operating said lift and said apron assembly in repeated cycles of movement to assemble a multi-layer stack of articles upon said lift; sheet dispensing means for placing stack stabilizing sheets in said stack between adjacent layers of articles comprising sheet gripping means on said apron assembly, sheet feeding means operable upon movement of said apron assembly from second position toward said first position to feed one end of a sheet to said gripping means to be gripped and carried across said shaft thereby, and means responsive to the arrival of said apron assembly at said first position for releasing the sheet from said gripping means to deposit the sheet upon the last deposited layer of articles.

8. In a pallet loading machine having a frame defining a lift shaft, a lift vertically movable within said shaft, an apron mounted on said frame for forward and rearward movement across the upper end of said shaft between a forwardly extended position overlying said lift and a retracted position withdrawn rearwardly from said shaft with the front edge of said apron adjacent the rear side of said shaft, means for assembling a layer of articles on said apron when said apron is in said extended position, means for stripping said articles from said apron upon movement of said apron to said retracted position to deposit the layer of articles upon said lift, and means for driving said apron and said lift in coordinated movement to assemble a multi-layer stack of articles upon said lift; sheet dispensing means for inserting sheets in said stack between adjacent layers of articles comprising sheet gripping means mounted on the lower side of said apron adjacent the front edge thereof, web feeding means on said frame responsive to movement of said apron away from said retracted position for feeding one end of an elongated web of sheet material to said gripping means to be carried across said shaft thereby, severing means for severing said web to form the end portion of said web gripped by said gripping means into a sheet adapted to overlie the last deposited layer of articles on said lift, and means operable upon the arrival of said apron in said extended position for releasing a sheet from said gripping means.

9. In a pallet loading machine having a frame defining a lift shaft, a lift vertically movable within said shaft, an apron mounted on said frame for forward and rearward movement across the upper end of said shaft between a forwardly extended position overlying said lift and a retracted position withdrawn rearwardly from said shaft with the front edge of said apron adjacent the rear side of said shaft, means for assembling a layer of articles on said apron when said apron is in said extended position, means for stripping said articles from said apron upon movement of said apron to said retracted position to deposit the layer of articles upon said lift, and means for driving said apron and said lift in coordinated movement to assemble a multi-layer stack of articles upon said lift; sheet dispensing means for placing sheets in said stack between adjacent layers of articles comprising means for guiding one end of an elongate web of sheet material to a ready location adjacent the retracted position of said one edge of said apron, sheet gripping means mounted on the lower side of said apron adjacent the front edge thereof, web feeding means responsive to movement of said apron away from said retracted position for advancing said one end of said web to said gripping means to be gripped and carried across said shaft thereby, severing means mounted adjacent said guiding means for severing the web to form the end portion of said web gripped by said gripping means into a sheet adapted to overlie the last deposited layer of articles upon said lift, means for stopping operation of said web feeding means when the severed end of said web has been advanced thereby to said ready location, and means responsive to the arrival of said apron at said extended position for releasing said sheet from said gripping means.

10. In a pallet loading machine having a pallet lift vertically movable in a lift shaft, an apron supported for forward and rearward movement between an article receiving position overlying said lift and a retracted position withdrawn from said lift shaft with the forward edge of said apron adjacent the rearward side of said shaft, means for assembling a layer of articles on said apron when said apron is in said article receiving position, means operable upon movement of said apron from said article receiving position to said retracted position for depositing the layer of articles upon said lift, and co-ordinated drive means for driving said lift and said apron in repeated cycles to form a multi-layer stack of articles on said lift; sheet dispensing means for placing a stack stabilizing sheet in said stack between adjacent layers of articles comprising an elongate web of sheet materials supported upon said machine in a roll, means for guiding the free end of said web from said roll to a ready location adjacent the retracted position of the front edge of said apron, gripping means mounted on said apron adjacent said front edge, means responsive to forward movement of said apron from said retracted position for feeding said free end of said web from said ready location to said gripping means to be gripped and carried across said shaft thereby, severing means located adjacent said guiding means and operable during forward movement of said apron for severing said web at a point between said roll and said ready location to form the portion of said web gripped by said gripping means into an individual stack stabilizing sheet, and means for releasing said sheet from said gripping means when said apron arrives at said extended position.

11. Apparatus as defined in claim 10 wherein said means responsive to forward movement of said apron comprises web feeding means adjacent said guide means at a location intermediate said roll and said severing means and operable upon forward movement of said apron from said retracted position to advance said web from said roll toward said ready location, and means operable subsequent to operation of said severing means for stopping operation of said feeding means when the severed end of said web is advanced to said ready location.

12. Apparatus as defined in claim 10 wherein said gripping means comprises a gripping element mounted for movement into and out of engagement with the lower surface of said apron, means biasing said gripping element against the lower surface of said apron, and means engageable by said gripping member when said apron is at said retracted position for holding said gripping element away from the lower surface of said apron against the action of said biasing means.

13. In a pallet loading machine comprising a frame defining a pallet lift shaft, a pallet lift vertically movable in said lift shaft, an apron, means supporting said apron for forward and rearward movement across said lift shaft between a forwardly extended article receiving position overlying said lift and a retracted position withdrawn rearwardly from said lift shaft with the front edge of said apron located adjacent the rearward side of said shaft, means operable when said apron is in said extended position for assembling a layer of articles upon said apron, stripping means extending across the rearward side of said shaft above said apron and operable upon movement of said apron to said retracted position to strip a layer of articles from said apron and deposit the layer of articles upon said lift, and lift control means coordinated with said apron drive means for lowering the lift in response to the depositing of a layer of the articles thereon until the upper surface of the deposited layer of articles is located at a selected level in said shaft; the improvement wherein said means supporting said apron upon said frame comprises rear support means supporting the rearward end of said apron for horizontal forward and rearward movement at a first level slightly above said selected level, front support means supporting the front edge of said apron for rearward horizontal movement to said retracted position at said first level and for forward horizontal movement to said extended position at a second level located above said first level for lowering the front edge of said apron from said second level to said first level during the initial portion of movement of said apron away from said extended position, and means during the initial portion of movement of said apron away from said retracted position for elevating the front end of said apron from said first level to said second level.

14. Apparatus as defined in claim 13 further comprising sheet dispensing means for feeding one edge of a stack stabilizing sheet into engagement with lower surface of apron adjacent the retracted position of the front edge of said apron, gripping means on said apron adjacent the front edge thereof operable upon movement of apron from said retracted position to grip said sheet adjacent said one edge thereof prior to the elevation of said front edge of said apron by said elevating means to carry said sheet across said shaft above the first deposited layer of articles, and means operable upon the arrival of said apron at said extended position for releasing said sheet from said gripping means.

15. Apparatus as defined in claim 13 wherein said rear support means comprises rear roller means mounted on each side of said apron adjacent the rearward edge thereof, and a pair of horizontal first roller tracks on said frame respectively supporting said rear roller means, said front support means comprising front roller means mounted on each side of said apron adjacent the front edge thereof, a second pair of tracks on said frame extending rearwardly along opposed sides of said lift shaft above said first tracks from the forward side of said shaft to a location spaced forwardly from the rearward side of said shaft, said front roller means being supported at the forward ends of said second tracks when said apron is in said extended position, means operable during the initial portion of movement of said apron away from said extended position for transferring support of said front roller means from said second tracks to said first tracks, and means operable during the initial portion of movement of said apron from said retracted position for transferring support of said front roller means from said first track to said second track.

16. In a pallet loading machine for assembling articles into a multilayer stack upon a pallet, said machine having a frame defining a pallet lift shaft, pallet supporting lift means operable in said shaft, a rectangular apron, means supporting said apron for movement between an article receiving position overlying said lift and a retracted position withdrawn from said shaft with the front edge of said apron located adjacent the rear side of said shaft, and a stripper bar extending across the rear side of said shaft above said apron and operable upon movement of said apron to said retracted position to strip articles from said apron to deposit the articles in a layer upon said lift; the improvement wherein said means supporting said apron comprises rear roller means on each side of said apron adjacent the rear edge thereof, first horizontal track means on said frame supporting said rear roller means during movement of said apron between said article receiving position and said retracted position, front roller means on each side of said apron adjacent a front edge thereof, and front roller supporting track means cooperable with said front roller means to shift said apron from a horizontal position to an upwardly and forwardly inclined position during the initial portion of forward movement of said apron from said retracted position and to maintain said apron in said inclined position throughout the remainder of forward movement of said apron to said article receiving position, and to shift said apron from said inclined position to a horizontal position during the initial portion of rearward movement of said apron from said receiving position and to maintain said apron in said horizontal position during rearward movement of said apron to said retracted position.

17. In a pallet loading machine for assembling articles into a multilayer stack upon a pallet, said machine having a frame defining a pallet lift shaft, pallet supporting lift means operable in said shaft, a rectangular apron, means supporting said apron for movement between an article receiving position overlying said lift and a retracted position withdrawn from said shaft with the front edge of said apron located adjacent the rear side of said shaft, and a stripper bar extending across the rear side of said shaft above said apron and operable upon movement of said apron to said retracted position to strip articles from said apron to deposit the articles in a layer upon said lift; the improvement wherein said means supporting said apron comprises rear roller means on each side of said apron adjacent the rear edge thereof, first horizontal track means on said frame supporting said rear roller means during movement of said apron between said article receiving position and said retracted position, front roller means on each side of said apron adjacent a front edge thereof, second horizontal track means operable to support said front roller means with said apron in a horizontal position, third horizontal track means located above said second track means operable to support said front roller means with said apron in an upwardly and forwardly inclined position, first means operable upon rearward movement of said apron from said article receiving position for transferring support of said front roller means from said third track means to said second track means, and second means operable upon forward movement of said apron from said retracted position for transferring support of said front roller means from said second track means to said third track means.

18. In a pallet loading machine for assembling articles into a multilayer stack upon a pallet, said machine having a frame defining a pallet lift shaft, pallet supporting lift means operable in said shaft, a rectangular apron, means supporting said apron for movement between an article receiving position overlying said lift and a retracted position withdrawn from said shaft with the front edge of said apron located adjacent the rear side of said shaft, and a stripper bar extending across the rear side of said shaft above said apron and operable upon movement of said apron to said retracted position to strip articles from said apron to deposit the articles in a layer upon said lift; the improvement wherein said means supporting said apron comprises a first horizontal track means extending rearwardly from a forward end adjacent the front side of said shaft to a location spaced rearwardly beyond the rearward side of said shaft, rear roller means at each side of said apron adjacent the rearward edge thereof supported upon said first track means, front roller means at each side of said apron adjacent the front edge thereof supported upon said first track means when said apron is in said retracted position, second horizontal track means located above said first track means and extending rearwardly from the front side of said lift shaft to a location spaced forwardly from said stripper bar, inclined track means operable upon forward movement of said apron from said retracted position to guide said front roller means from said first track means to said second track means, and means operable upon rearward movement of said apron from said receiving position for guiding said front roller means from said second track means to the forward end of said first track means.

References Cited in the file of this patent

UNITED STATES PATENTS

| | | |
|---|---|---|
| 1,592,767 | House | July 13, 1926 |
| 2,739,718 | Birchall | Mar. 27, 1956 |
| 2,774,489 | Guigas | Dec. 18, 1956 |